Nov. 12, 1929.          B. S. HARRIS ET AL          1,735,755
                          REAPER THRASHER
                         Filed May 9, 1927
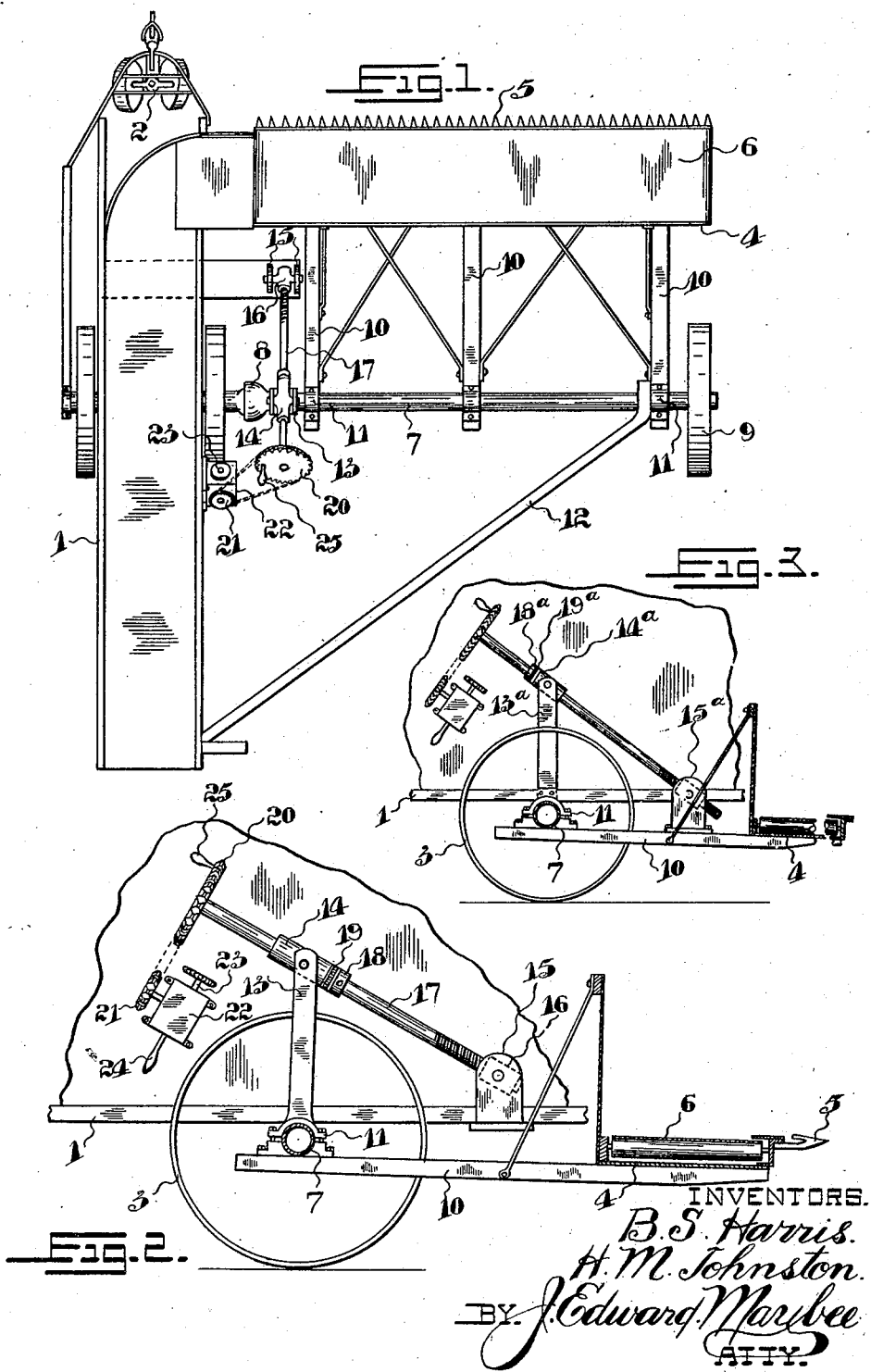

Patented Nov. 12, 1929

1,735,755

UNITED STATES PATENT OFFICE

BURTON S. HARRIS AND HOWARD M. JOHNSTON, OF TORONTO, ONTARIO, CANADA, ASSIGNOR TO MASSEY-HARRIS COMPANY, LIMITED, OF TORONTO, CANADA

REAPER THRASHER

Application filed May 9, 1927. Serial No. 189,898.

This invention relates to implements adapted to cut grain and thrash it in the field, which employ cutting means, conveying means, and thrashing means driven usually by an internal combustion engine carried by the machine. The cutter bar is mounted and reciprocated on the header platform in the usual manner. Our object is to provide simple means for effecting the vertical adjustment of the header platform and which will permit the automatic lifting of the header platform in the event of the cutter bar guards encountering obstacles on the ground tending to lift the platform.

We attain our object by supporting the header platform from a rockable bar extending behind the platform. One end of this bar is journalled by means of a ball and socket universal joint on the main frame of the reaper-thrasher and the other end of the bar is supported by a ground wheel which is journalled thereon. To the bar are secured forwardly extending members for supporting the header-platform and an arm on which a sleeve is pivotally carried. A screw slidably mounted in the sleeve is threaded into a nut pivotally carried on the main frame. The screw is provided with a collar for engagement with an end of the sleeve whereby the header platform may be adjusted relative to the ground. The screw may be power driven or manually operated in any suitable manner. The constructions are hereinafter more fully described and illustrated in the accompanying drawings in which Fig. 1 is a plan view of part of a reaper-thrasher showing my improvements thereon;

Fig. 2 a cross section, on an enlarged scale, of the header-platform showing the preferred form of adjusting mechanism therefor; and Fig. 3 a view similar to Fig. 2 on a reduced scale showing a modified form of adjusting mechanism.

In the drawings like numerals of reference indicate corresponding parts in the different figures.

1 is part of the main frame of a reaper-thrasher which is supported by the fore-carriage 2 and the ground wheels 3. On this frame are carried various parts of the machine which are not shown nor described as they form no part of the present invention. Extending laterally from the forward part of the frame 1 is a header platform 4 which carries the cutter bar guards 5 and the conveyor 6 which are of ordinary type.

The header platform is carried in the following manner. A supporting bar 7 is connected by a ball and socket universal joint 8 with the main frame. Preferably the ball member is formed on or is secured to the transverse shaft on which the wheels 3 are journalled and the socket member is secured to the bar 7, which extends laterally behind the header platform. On the outer end of the bar is journalled a ground wheel 9. Members 10 secured by means of clamps 11 to the bar 7 extend forwardly and are secured to the header platform to support the latter from the bar. From the description it is obvious that the bar 7 is free to oscillate or rock on its end connections and that the header platform will swing on the axis of the bar in a vertical plane. The ball and socket joint 8 is also adapted to permit the header platform to be swung inwardly in a horizontal plane towards the machine. The purpose of this is to reduce the width of the machine to enable it to pass through standard sized gate-ways. A diagonal brace 12 holds the header platform in working position. The engagement between the brace and the bar 7 is such that the latter is free to rock on its axis.

To adjust the header platform relative to the ground we secure an arm 13 to the bar 7 (see Fig. 2). The upper end of this arm is forked and between the forked ends is pivotally mounted a sleeve 14. Between a pair of lugs 15 carried on the main frame 1 is pivotally carried a nut 16. A screw 17, journalled in the sleeve and provided with a fixed collar 18 and a thrust bearing 19 for engagement with the inner end of the sleeve, is threaded into the nut. The screw is provided with a sprocket 20 which is connected by a chain with a sprocket 21 of a gear box 22. The gear box is of ordinary construction and is provided with a drive shaft 23 which may be actuated in any convenient manner from the power plant of the machine. The gear box includes reverse gear mechanism operable through the medium of a handle lever 24 which in Fig. 2 is shown in neutral position so that the screw may be manually operated by a hand grip 25 secured to the sprocket 20. It is obvious that by rotating the screw in one direction the header platform will be lowered and by rotating the screw in the opposite direction the platform will be raised relative to the ground.

A modified arrangement of the adjusting means is shown in Fig. 3. The arm 13$^a$ is secured to the frame 1 and the lugs 15$^a$ are carried on a forwardly extending header platform supporting member 10. The collar 18$^a$ and thrust bearing 19$^a$ engage the outer end of the sleeve 14$^a$.

In either the preferred or the modified form of adjusting device the header platform is free to swing upwardly if the cutter bar guards 5 strike an obstacle on the ground. When this occurs the sleeve 14 in Fig. 2 moves away from the collar 18 on the screw and in Fig. 3 the collar 18$^a$ moves away from the sleeve 14$^a$.

What we claim is:

1. In a harvester, the combination of a main frame; a header platform extending laterally therefrom; a rockable header platform supporting bar having one end suitably carried by the frame and extending behind the header platform; a ground wheel journalled on the other end of the bar; forwardly extending header platform supporting members secured to the rockable bar; a pivotally mounted nut part; a pivotally mounted sleeve part; a supporting screw journalled in the sleeve part and threaded in the nut part; a collar on the supporting screw engaging the sleeve part, one of the said parts being movable with the header platform and the other of the said parts being connected with the main frame whereby the header platform may be adjusted by means of the supporting screw relative to the ground and may be lifted independently of the screw.

2. In a harvester, the combination of a main frame; a header platform extending laterally therefrom; a rockable header platform supporting bar having one end suitably carried by the frame and extending behind the header platform; a ground wheel journalled on the other end of the bar; forwardly extending header platform supporting members secured to the rockable bar; a nut pivotally carried on the main frame; an arm carried by the bar; a sleeve pivotally mounted on the arm; a supporting screw journalled in the sleeve and threaded in the nut; a collar on the supporting screw engaging the sleeve to support the header platform; and means for rotating the supporting screw to adjust the header platform relative to the ground.

3. In a harvester the combination of a main frame having a transverse shaft; ground wheels carried on the said shaft; a header platform extending laterally from the main frame; a rockable header platform supporting bar extending behind the header platform; a ball and socket universal joint connection between one end of the said bar and the said shaft; a ground wheel journalled on the other end of the said bar; forwardly extending header platform supporting members secured to the said bar; and means for rocking the bar to adjust the header platform relative to the ground.

Signed at Toronto, Canada, this 2 day May, 1927.

BURTON S. HARRIS.
HOWARD M. JOHNSTON.